US005305510A

United States Patent [19]

Croft et al.

[11] Patent Number: 5,305,510

[45] Date of Patent: Apr. 26, 1994

[54] HYDRAULIC ASSEMBLY TOOL WITH IMPROVED LOAD BEARING ARRANGEMENT FOR TUBE FITTINGS

[75] Inventors: Steven T. Croft, Atherton; Maxwell B. Ho, San Jose, both of Calif.

[73] Assignee: Lokring Corporation, Foster City, Calif.

[21] Appl. No.: 931,855

[22] Filed: Aug. 18, 1992

Related U.S. Application Data

[63] Continuation of Ser. No. 505,897, Apr. 6, 1990, abandoned.

[51] Int. Cl.[5] .................. B23P 19/04

[52] U.S. Cl. .................. 29/237; 29/252; 29/282

[58] Field of Search .................. 29/234, 235, 237, 252, 29/282; 83/51, 639

[56] References Cited

U.S. PATENT DOCUMENTS

| | | | |
|---|---|---|---|
| 3,299,496 | 1/1967 | Christensen | 29/237 |
| 3,653,115 | 4/1972 | Perkins | 29/237 |
| 3,726,122 | 4/1973 | Dawson | 29/237 |
| 3,727,289 | 4/1973 | Bemelmann et al. | 29/237 |
| 3,742,754 | 7/1973 | Jeromson, Jr. et al. | 29/237 |
| 4,189,817 | 2/1980 | Moebius | 29/237 |
| 4,345,361 | 8/1982 | Baumann | 29/237 |

*Primary Examiner*—Bruce M. Kisliuk
*Assistant Examiner*—Eileen P. Morgan

[57] ABSTRACT

A hydraulic assembly tool (70) includes a fixed jaw (76) and a movable jaw (78). The movable jaw (78) includes load bearing surfaces (86,118) which provide for even wear and counter torsional forces in order to increase the useful life of the tool (70).

30 Claims, 13 Drawing Sheets

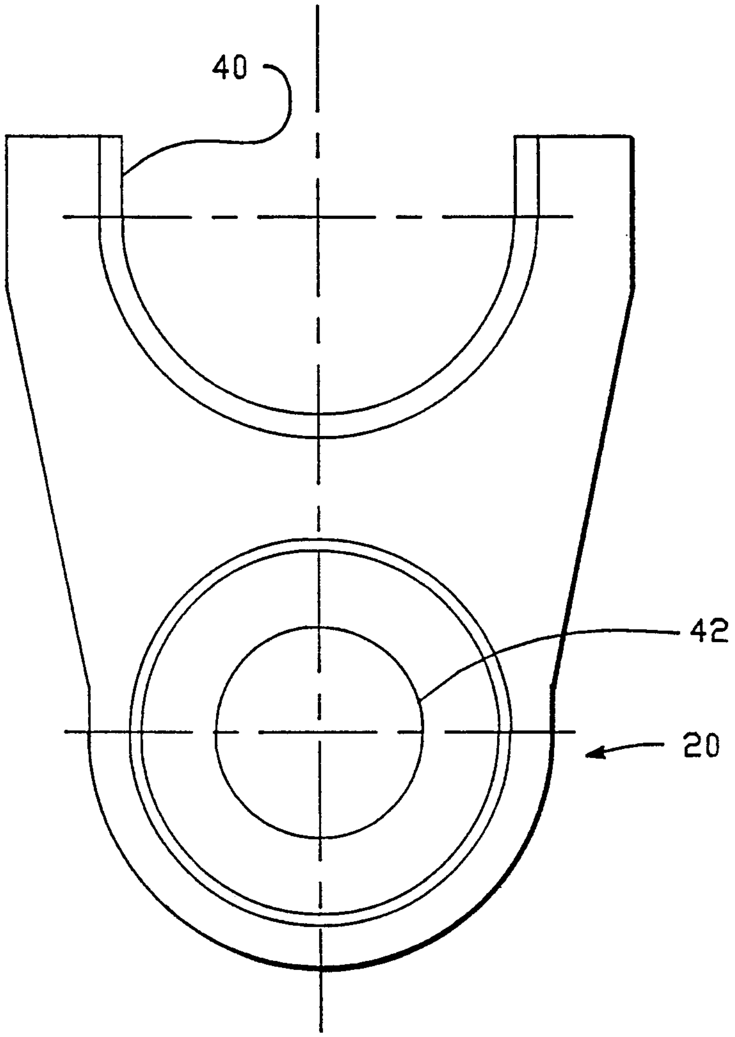
PRIOR ART
FIG.−14

HYDRAULIC ASSEMBLY TOOL WITH IMPROVED LOAD BEARING ARRANGEMENT FOR TUBE FITTINGS

This application is a continuation of Ser. No. 07/505,897, filed Apr. 6, 1990, now abandoned.

FIELD OF THE INVENTION

The present invention is directed to a hydraulic tool and in particular, to a hydraulic tool which can be used for axial engagement of a fitting and for other operations where precise axial motion is required.

BACKGROUND OF THE INVENTION

Presently available are a number of hydraulic tools used for assembling, shaping, forming, and otherwise, manipulating materials. By way of example, U.S. Pat. No. 4,189,817 issued on Feb. 26, 1980 and entitled "HYDRAULIC ASSEMBLY TOOL FOR TUBE FITTINGS" is directed to a highly useful and successful tool having a fixed and a removable jaw, both jaws of whioh are capable of precise coaxial movement in order to force together a tube or pipe fitting. This U.S. Patent is incorporated herein by reference. A similar hydraulic assembly tool is depicted in FIGS. 13 and 14. As can be seen in FIG. 13, the prior art hydraulic assembly tool 20 includes a body structure 22 whioh houses a hydraulic cylinder 24 into which is reciprocally mounted piston 26. A shaft 28 extends from the piston 26. Hydraulic fluid, entering through port 30, urges the piston 26 out of the hydraulic cylinder 24 and spring 32 connected between the piston 26 and the hydraulic cylinder 24 causes the piston 26 to be drawn back into the hydraulic cylinder 24 once hydraulic pressure is relieved.

The shaft 28 is guided by a bore 34. Mounted onto the shaft 28 is a movable jaw 36 which extends substantially radially from a central axis 38 of the shaft 28. Movable jaw 36 is press fit onto the shaft 28. Located in a radially manner from the bore 34 is a fixed jaw 40. Between the fixed jaw 40 and the movable jaw 36, fittings can be positioned. With hydraulic fluid introduced into the hydraulic cylinder 24, the movable jaw 36 is urged toward the fixed jaw 40 causing the fitting to be compressed about and join two pipes or tubes together.

As a result of repeated usage of the tool, there is wearing at the upper bearing surface 42 of the cylindrical bore 34 as well as the upper bearing surface 44 of the cylindrical shaft 28. Thus, overtime, the bore 34 becomes elongated. Additional wear occurs between the upper bearing surfaces 46 and 48 of the hydraulic cylinder 24 and the piston 26, respectfully. Further, uneven wear occurs on the bearing surface 50 which is defined by the movable jaw 36 and which surface 50 bears upon the body structure 22 immediately above the hydraulic cylinder 24. Additionally, flexure in the connection between the movable jaw and piston causes misalignment of the two jaws.

SUMMARY OF THE INVENTION

The present invention is directed to improving upon the prior art.

Accordingly it is an object of the present invention to provide a hydraulic assembly tool which is designed to balance bending moments created when a work is being compressed between the jaws of the hydraulic tool.

It is further an object of the present invention to provide a hydraulic assembly tool which allows the pipes to be joined by the pipe fitting in a collinear manner.

It is another object of the present invention to provide a hydraulic assembly tool which is easy to manufacture, to assemble, and to align.

It is yet another object of the present invention to provide a hydraulic assembly tool which has large flat bearing surfaces which resist the bending moments, which are easy to manufacture, inspect, and align, and whioh provide for even wear and which are rigidly joined to the jaws to maintain precise alignment under heavy loading.

It is another object of the present invention to provide a hydraulic assembly tool which has a movable jaw which is designed to use the least amount of material necessary for structural integrity and to resist bending moments and fatigue fracture.

It is still another object of the present invention to provide a hydraulic assembly tool whereby the movable jaw is flexibly secured to a hydraulic cylinder in order to allow for slight misalignments.

It is yet another object of the present invention to provide means for preloading the movable jaw so that it has a desired alignment prior to the jaw engaging the material to be joined.

It is a further object of the present invention to provide a hydraulic assembly tool whioh, with the substitution of other elements for fixed and movable jaws, can provide a number of other functions including joining, forming and severing materials.

Accordingly, the hydraulic tool of the present invention includes a body structure with a hydraulic cylinder having a central axis. A piston is removably received in the hydraulic cylinder with an axis that is collinear with the central axis. A first carrier unit is defined by the body structure and a second carrier unit, axially movable with the piston towards the first carrier unit, is provided. Means are further provided for securing the second carrier unit to the piston. Further, a second carrier unit angular moment resisting means is provided including a first bearing surface provided in slidingly engagement with the hydraulic cylinder and a second bearing surface whioh is slidingly engaged with another portion of the body structure. The first and second carrier units define first and second work receiving means, which first and second work receiving means define a common axis that is parallel to the central axis of the hydraulic cylinder.

In another aspect of the invention, the first bearing surface is substantially parallel to but faces oppositely with respect to the second bearing surface. The first bearing surface exerts a force on the body structure represented by a first force vector and the second bearing exerts a force on the body structure represented by a second force vector. The first and second force vectors are substantially parallel but oppositely directed with respect to each other.

In yet another aspect of the invention, the first and second bearing surfaces are substantially flat.

In still another aspect of the invention, the body structure defines a channel located adjacent the central axis and in substantial radial alignment with the first carrier unit. The second bearing surface is provided in sliding engagement with the channel.

In yet another aspect of the invention, means are provided for securing the second carrier unit onto the piston including means for causing a force to be transferred from the piston to the second carrier unit along the central axis.

In still a further aspect of the invention, the securing means includes means for allowing the adjustment of the position of the second carrier unit with respect to the piston prior to the engagement of the work between the first and second work receiving means. After the work has been engaged, such flexible connection does not effect the position of the second carrier unit relative to the piston. Such means includes a flexible connection between the piston and the second carrier unit.

In yet another aspect o± the present invention, means are provided for preliminarily preloading the bearing surfaces until work is received by the first and second carrier units.

In still another aspect of the invention, the first and second carrier units can include devices for holding, assembling, severing, forming and otherwise manufacturing desired products.

BRIEF DESCRIPTION OF THE FIGURES

FIG. 14 depicts a left end elevational view of the prior art hydraulic assembly tool of FIG. 13.

DETAILED DESCRIPTION OF THE PREFERRED EMBODIMENT

Figure 1:
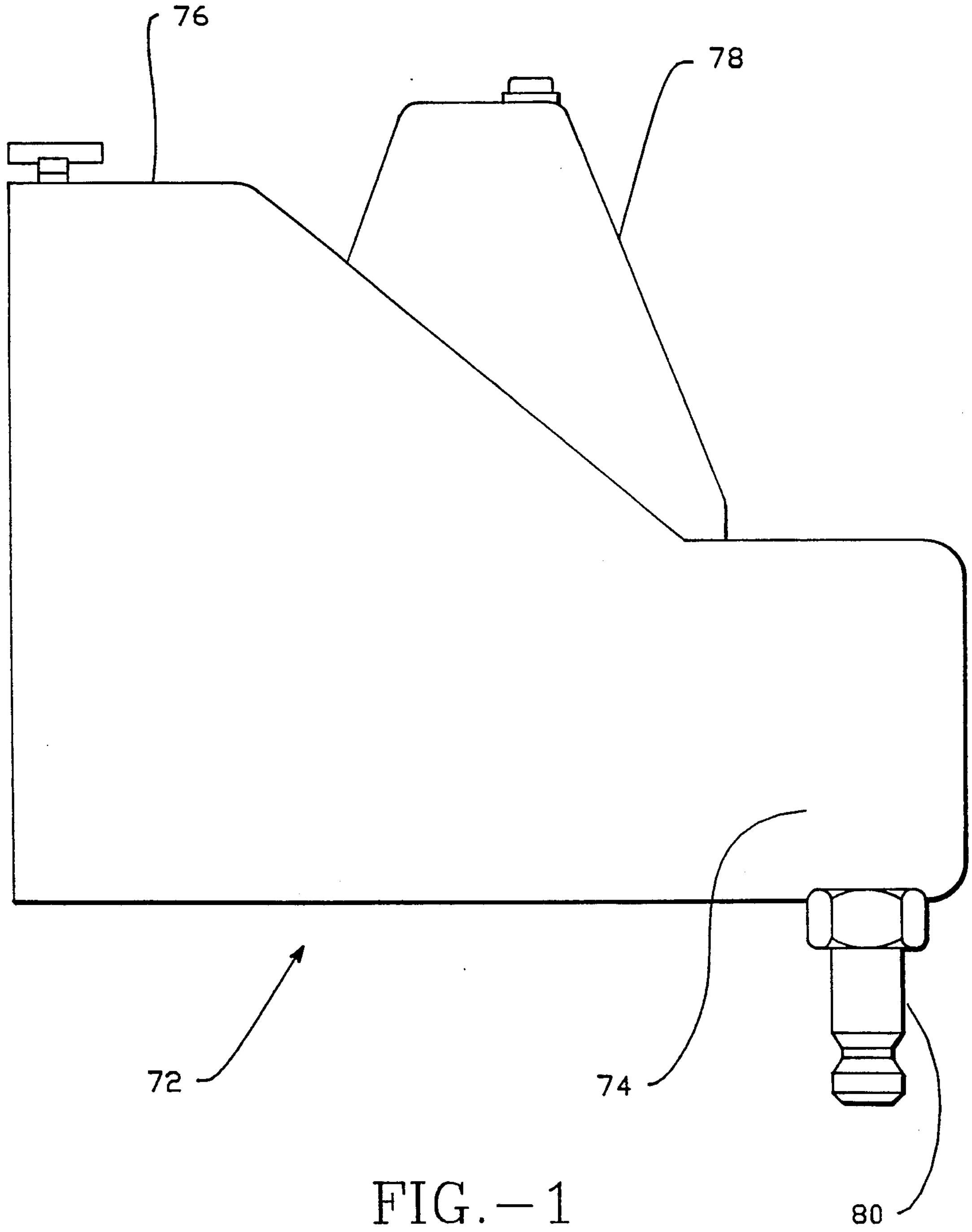
FIG. 1 depicts a side elevational view of an embodiment of the hydraulic assembly tool of the invention.

With reference to the figures and in particular to FIG. 1, hydraulic assembly tool 70 is depicted. This hydraulic assembly tool 70 includes a body structure 72 which has a hydraulic cylinder 74 with a fixed jaw 76. Slidingly mounted on the body structure 72 is a movable jaw 78. A hydraulic fitting 80 is provided for introducing hydraulic fluid into the hydraulic cylinder 74.

Figure 2:
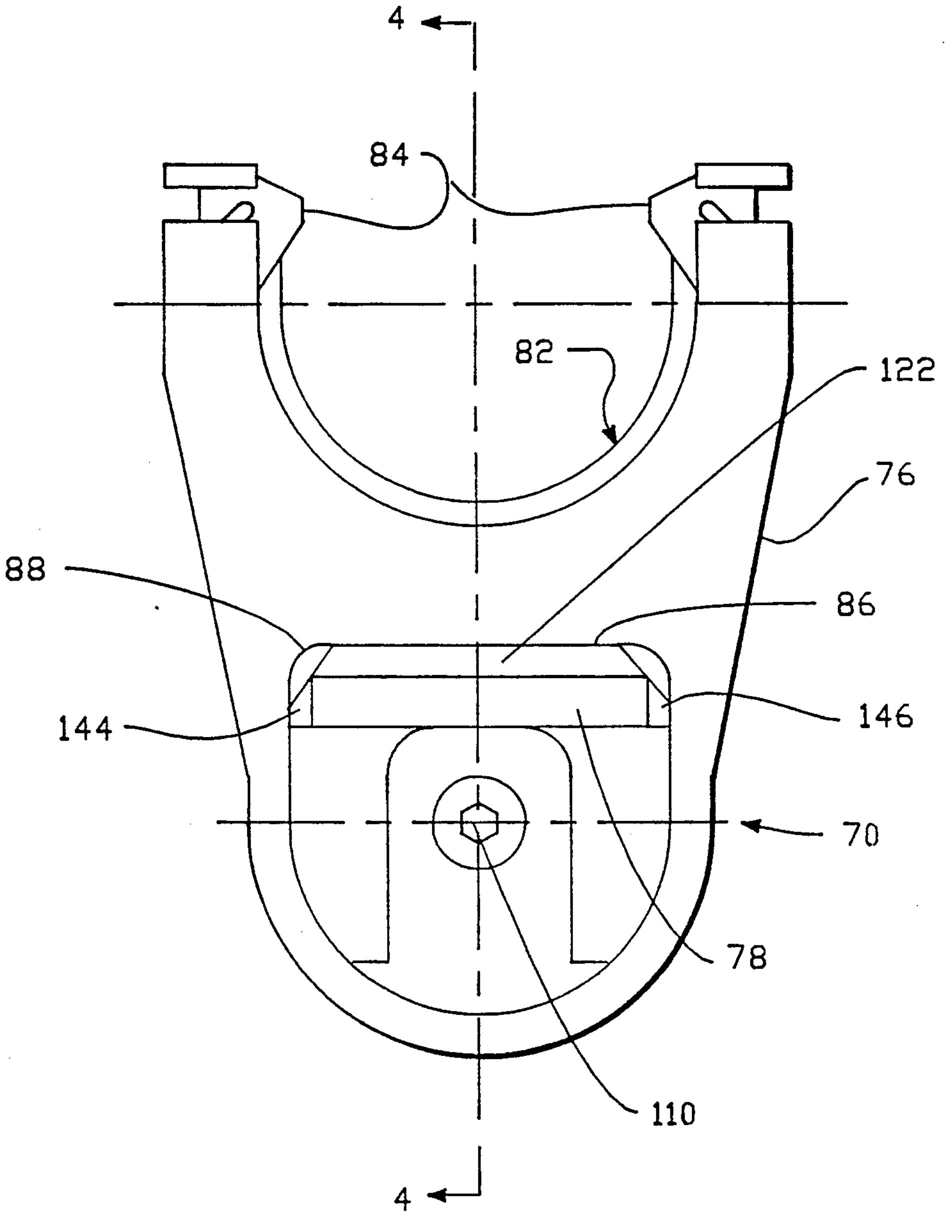
FIG. 2 depicts a left end elevational view of the embodiment of FIG. 1.

FIG. 2 depicts a left end elevational view of the hydraulic assembly tool 70 and in particular of fixed jaw 76, with the fitting receiver 82 of the fixed jaw 76. As presented in greater detail hereinbelow with respect to FIG. 5, spring loaded retainers 84 are provided for securing the fitting within the fitting receiver 82 of the fixed jaw 76 and for subsequently releasing the fitting from the fixed jaw 76. A portion of the movable jaw 78 is depicted and, in particular, a bearing surface 86. As can be seen in FIG. 2, the bearing surface 86 is provided in a channel 88 which is defined by the body structure 72 immediately below the fixed jaw 76.

Figure 3:
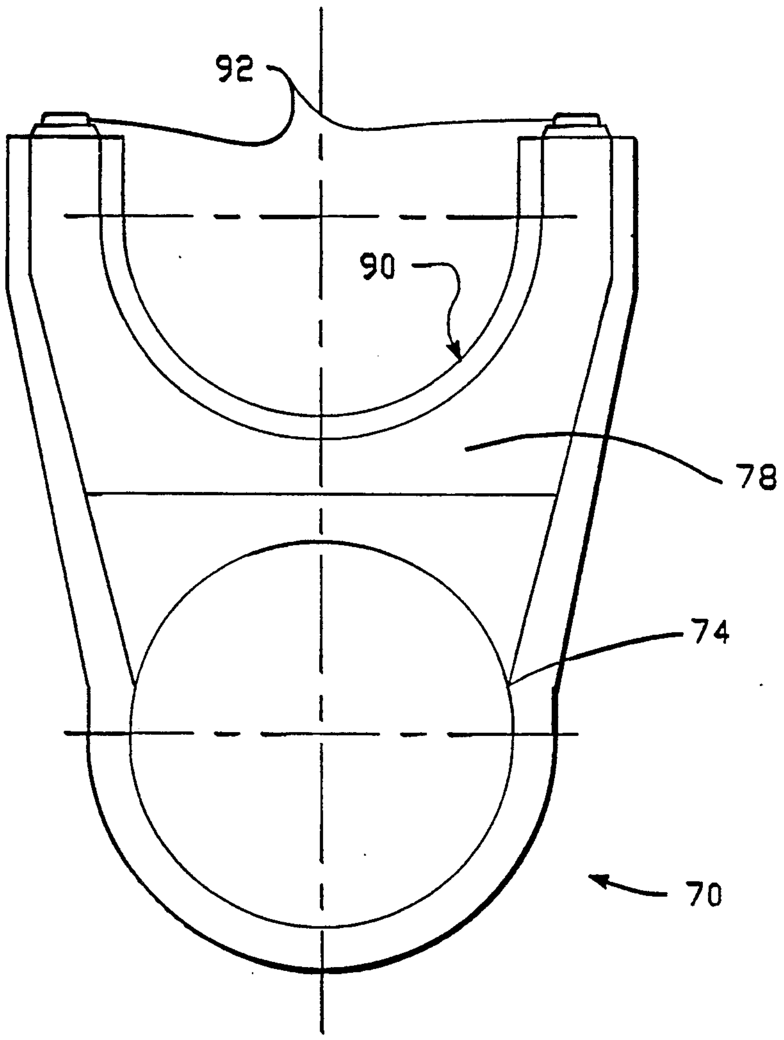
FIG. 3 depicts a right end elevational view of the embodiment of FIG. 1.

FIG. 3 depicts a right end elevational view of the hydraulic tool 70 showing the hydraulic cylinder 74 and the movable jaw 78. The movable jaw 78 defines a fitting receiver 90 which includes spring loaded retainers 92. As presented below with respect to FIG. 4, retainer 92 can secure the fitting in the movable jaw 78 and then be urged out of the way to release the fitting from the module jaw 78.

It is to be understood that like the above referenced U.S. Patent whioh is incorporated herein by reference the present fixed and movable jaws 76, 78 can be replaced by other devices such as, for example, sheering or forming devices and other assembly devices, and the basic hydraulic mechanism as described herein can be used to perform functions other than using the appropriate fittings to assemble pipes and tubes.

Figure 4:
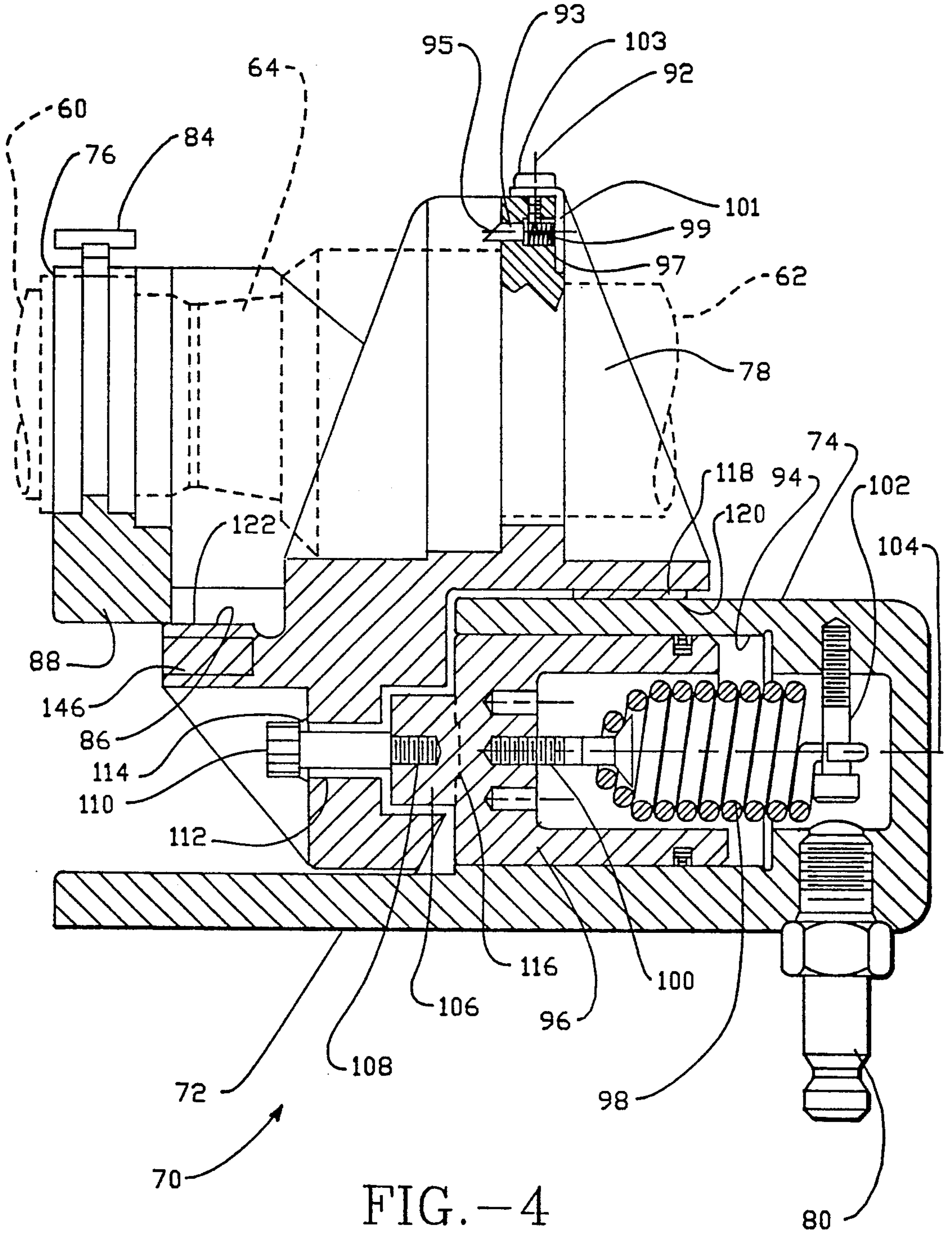
FIG. 4 depicts a cross-sectional view of the embodiment of FIG. 1 taken through line 4—4 in FIG. 2.

FIG. 4 depicts a cross-sectional view of the embodiment of FIG. 1. In this view, it can be seen that the hydraulic cylinder 74 defines a cylindrical bore 94 which receives a cylindrical piston 96. A spring 98 is secured between the piston 96 and the hydraulic cylinder 74 by securing screws 100, 102 respectfully. Hydraulic fluid provided through fitting 80 urges piston 96 out of the cylindrical bore 94 in a linear fashion. When the pressure caused by the hydraulic fluid is released, the spring 98 causes the piston 96 to be urged back into the hydraulic cylinder 74.

Extending from the hydraulic piston 96, along a central axis 104 of the hydraulic piston 96 and the hydraulic cylinder 74, is a short shaft 106 which has a tapped bore 08. As will be discussed below, the movable jaw 78 is secured over the shaft 106 and to the piston 96 by a bolt 110 which is provided through a bore 112 in the movable jaw 78 and received in the tapped bore 108. A flexible belleville washer 114 or other appropriate mechanism is provided between the bolt 110 and the movable jaw 78 to provide a flexible connection between the movable jaw 78 and the hydraulic piston 96 in order to compensate for any slight misalignments between the moveable jaw 78 and the body structure 72.

The movable jaw 78 includes a raised load bearing surface 116 whioh is located on the central axis 104. This load bearing surface 116 includes two pads provided on opposite sides of the central axis 104 with only one of the pads 117 (FIGS. 4, 8) shown at 116. It is noted that there is no transfer of force between the piston 96 and the movable jaw 78 either above or below the central axis as such transfer, and in particular, transfer below the central axis 104 could impart a significant torsional load or bending moment on the piston 96. A transfer of force below the central axis 104 may result in an unacceptably high torsional load on bending moment being placed on the movable jaw 78. Further, the semi-flexible connection provided by the bolt 110 and the belleville washer 114 assist in relieving such torsional loading or bending moments. This flexibility allows relative motion to occur between the piston 96 and the movable jaw 78 without imparting any significant loading onto the piston.

The movable jaw 78 includes a raised load bearing surface 118 which is provided in contact with the body structure 72 and in particular with a portion of the body structure 72 immediately above the hydraulic cylinder 74. The raised load bearing surface 118 can, in a preferred embodiment, include an insert pad 120 whioh is made of a material different from that of the hydraulic cylinder 74 in order to reduce wearing and other problems associated when like metals are provided in rubbing contact. The pad 120 can be replaceable after a preset amount of wear has occurred.

It is noted that the raised load bearing surface 118 is provided rearwardly of the raised load bearing surface 116. In a preferred embodiment, the raised load bearing surface 118 is substantially flat allowing for a uniform distribution of the load across the entire face of the insert pad 120.

Immediately forward of the raised load bearing surface 116 is another raised load bearing surface which was previously identified by numeral 86. As previously indicated, the load bearing surface 86 slidingly engages channel 88. Further, as previously indicated, the load bearing surface (86 and the channel 88 are located substantially, below, in this embodiment,the fixed jaw 76 (i.e., perpendicular with respect to the longitudinal axis 104 of shaft 106 and hydraulic cylinder 74). An insert pad 122 similar to insert pad 120 can be provided on or define the raised load bearing surface 86.

It is to be understood that raised load bearing surfaces 86 and 118 are substantially parallel to each other but oppositely faced and resist angular moment of the movable jaw 78 about an axis perpendicular to the plane of FIG. 4. The loads on these two bearing surfaces counter the loads which are experienced by the movable jaw 78 as fittings 64 are applied to pipes or tubing 60, 62. The raised load bearing surfaces 86, 118 and the insert pads 120, 122 are substantially flat and the load is distributed evenly across the surfaces 86, 118 and the pads 120, 122 in order to provide for even wearing.

Figure 8:
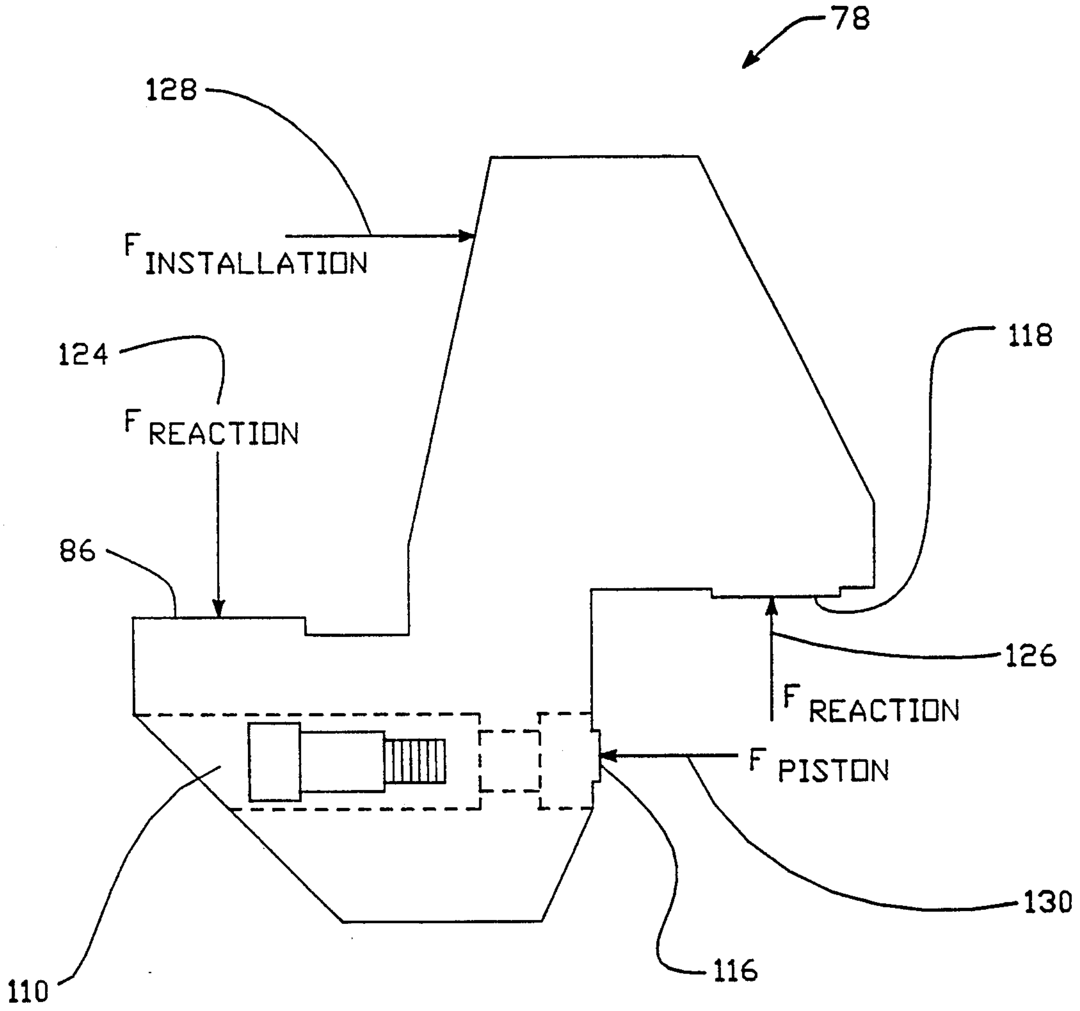
FIG. 8 depicts a force diagram of the forces present on the movable jaw of the hydraulic assembly tool of FIG. 4
Figure 13:
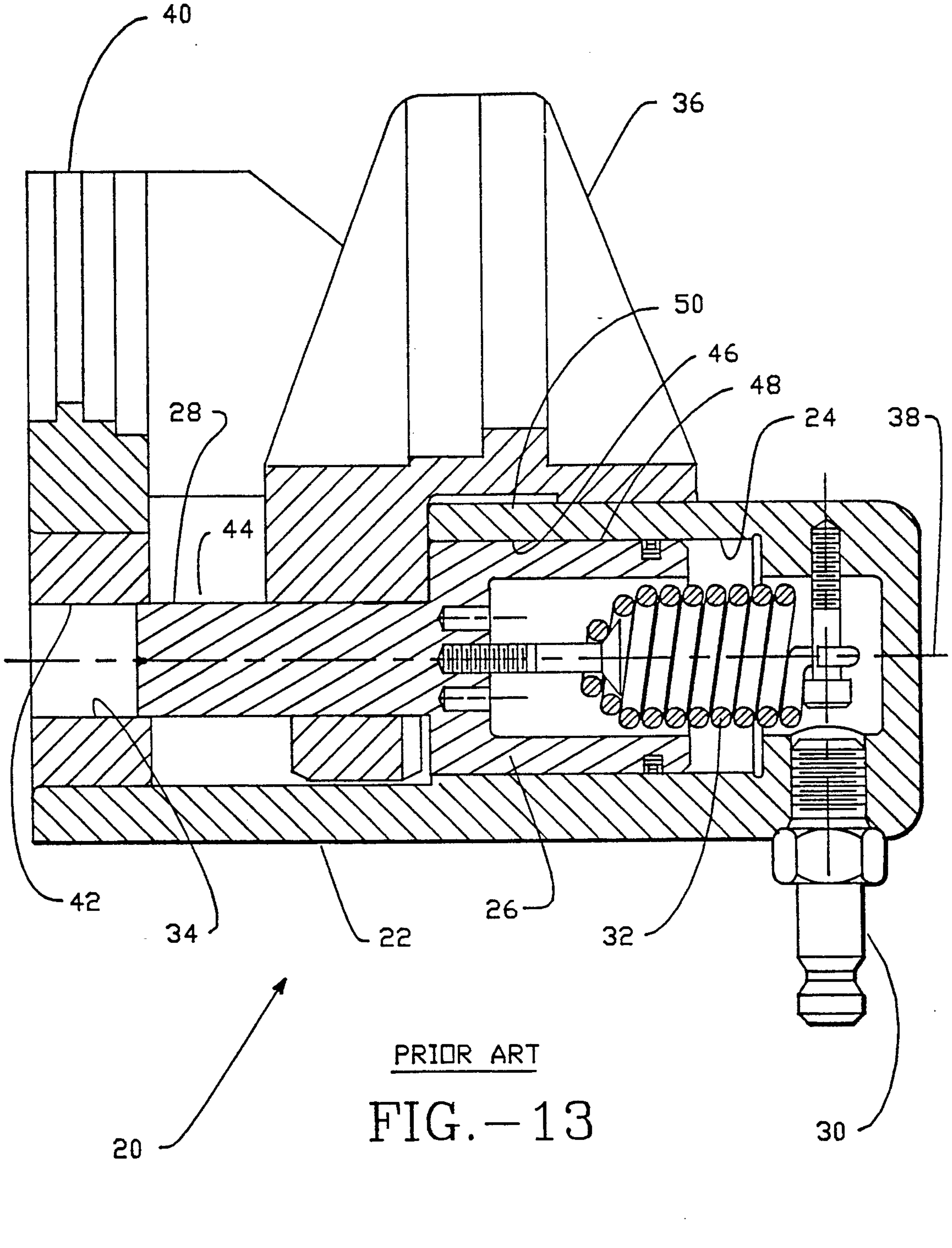
PRIOR ART FIG.—13
FIG. 13 depicts a front elevational cross-sectional view of a prior art hydraulic assembly tool.

FIG. 8 depicts a forced diagram representative of the forces which are experienced by the movable jaw 78. As can seen, the reaction forces vector 124, 126 experienced by the raised load bearing surfaces 86, 118 are equal, collinear but opposite. Further, loading experienced by the movable jaw due to installation of a fitting, as represented by the force vector 128, is equal and opposite to the force vector 130, which is representative of the force placed on the movable jaw 78 by the piston 96. Further, the bending moments created by these forces cancel each other out so that there is substantially no bending moment experience on the movable jaw 78. Further, as the load bearing surfaces are substantially broad and flat and thus as is wear uniformly distributed across the surfaces, there is no excess wear which can result in the moment of the movable jaw 78 becoming unaligned with respect to the central axis 104 resulting in a net torsional force or bending moment which can cause fatigue and failure as indicated in the prior art device of FIG. 13. Accordingly, with the present invention, there is no excess wear on the load bearing surfaces previously described and no excess wear with respect to the piston and the hydraulic cylinder. Thus, the size of the movable jaw 78 does not have to be increased in order to strengthen the movable jaw 78 where fracture could occur.

Figure 5:
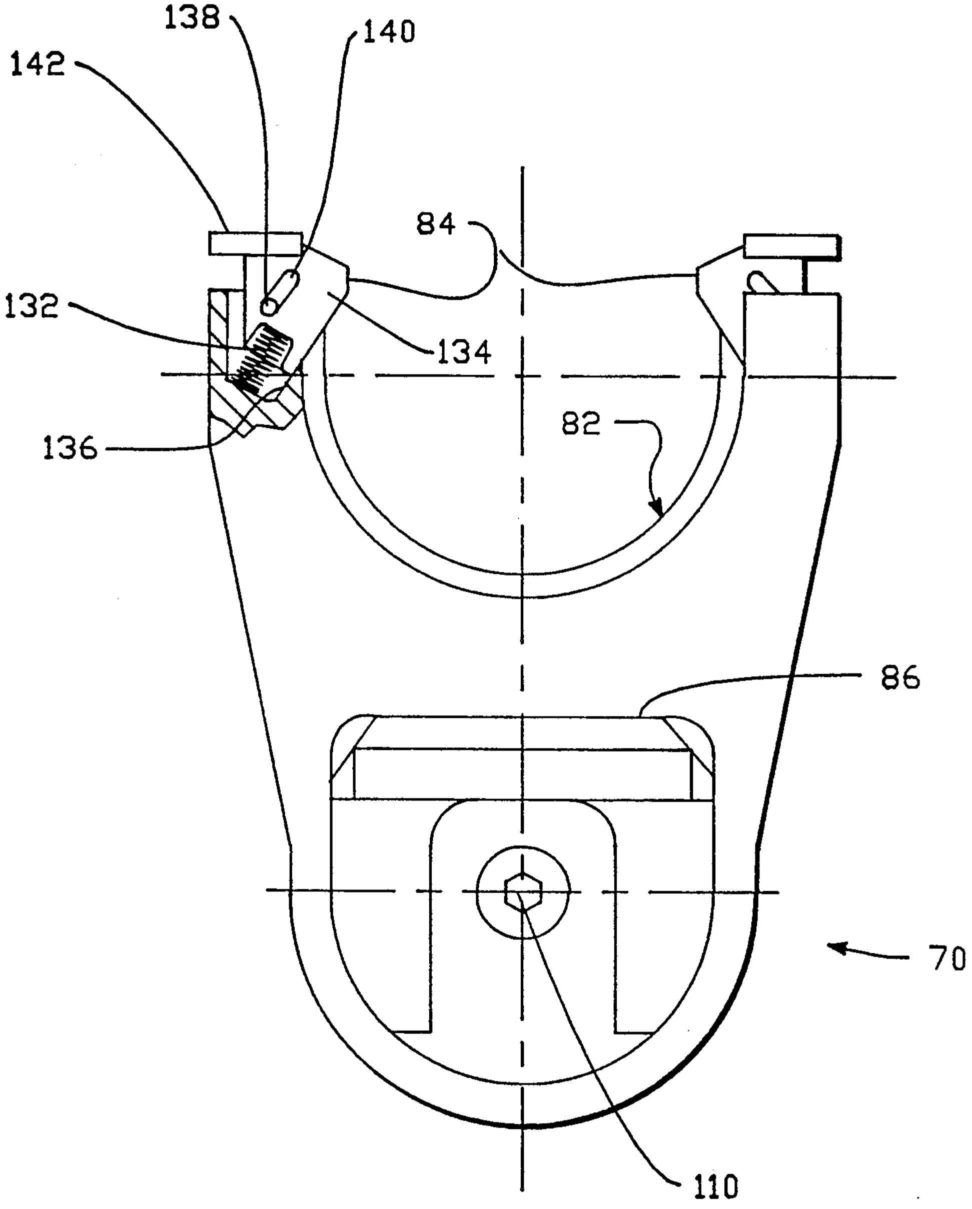
FIG. 5 depicts a partially broken away and cross-sectional view of the embodiment of FIG. 2.

The spring loaded retainers 84 include, as can be seen in FIG. 5, a spring 132 which urges a retaining member 134 out of slot 136 as guided by a pin 138 received in a slot 140 defined by the retainer member 134. A tube can be urged into the fitting receiver 82. Such urging simultaneously causes the retainer member 134 to be urged back into the slot 136 and then springingly urged out of the slot 136 in order to retain the tube now received in the fitting receiver 82. In order to remove the tube, button 142 is depressed, causing the retaining member 134 to be urged back into the slot 136.

The spring loaded ;retainers 92, mounted on the movable jaw 78 (FIG. 4 include a pin 93 with a sloping surface 95, which pin 93 is mounted in a bore 97. A spring 99 urges pin 93 out of bore 97 in order to retain the fitting 64 in movable jaw 78. Clip 101 holds spring 99 in bore 97 and screw 103 is positioned adjacent a flat side of pin 93 to maintain the orientation of sloping surface 95. When a fitting 64 is placed between jaws 76, 78, fitting 64 slides on sloping surface 95 and thereby urges pin 93 out of the way and into bore 97. When fitting 64, is seated in movable jaw 48 and no longer contacts sloping surface 95 pin 93 is urged out of bore 97 by spring to retain fitting 64 in position. When the pipes are secured together, the movement of the movable jaws 7B away from the fixed jaw 76 and the fitting 64 carries pin 93 out of the way of fitting 64.

As can be seen in FIG. 4, tubes or pipes 60, 62 are received in the hydraulic assembly tool 70 between the fixed jaw 76 and the movable jaw 78. The tube fitting can include one of a number of fittings. In particular it is contemplated that the tube fitting can include, by way of example only, the tube fittings disclosed in U.S. Pat. No. 4,061,367 issued Dec. 6, 1977 and entitled "LOCK-RING TUBE JOINT". Alternatively, the fitting could include the tube fitting described in U.S. Pat. No. 4,482,174 issued on Nov. 13, 1984 and entitled "APPARATUS AND METHOD FOR MAKING A TUBE CONNECTION". Both of these references are incorporated herein by reference.

As can seen in FIG. 2, additional raised load bearing surface 144, 146 are provided along the sides of and substantially perpendicular to the load bearing surface 86 in order to keep the movable jaw 78 parallel in the channel 88. The raised load bearing surface 144, 146 can include replaceable insert pads, as described with respect to the other raised load bearing surfaces.

Figure 6:
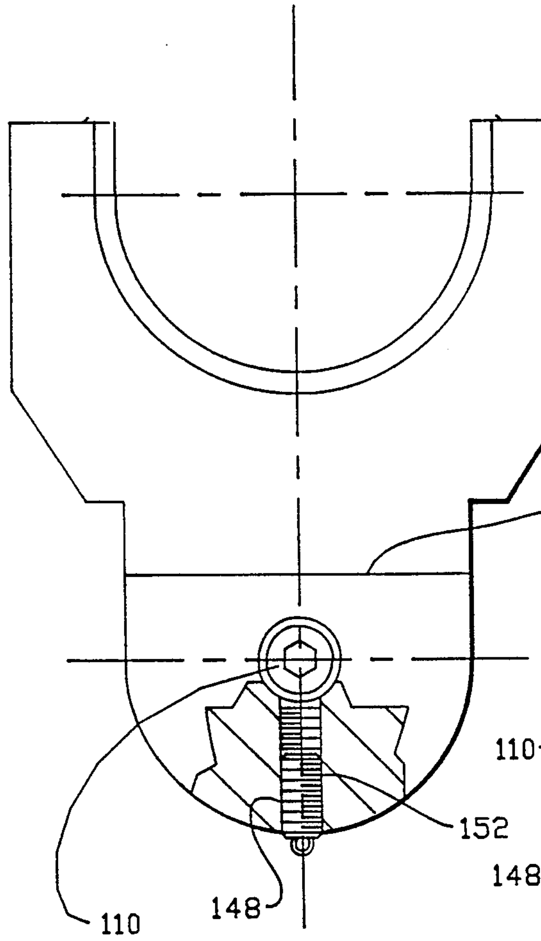
FIG. 6 depicts a side, partially broken away, elevational view, similar to FIG. 4 depicting the preloading device of FIG. 6.
Figure 7:
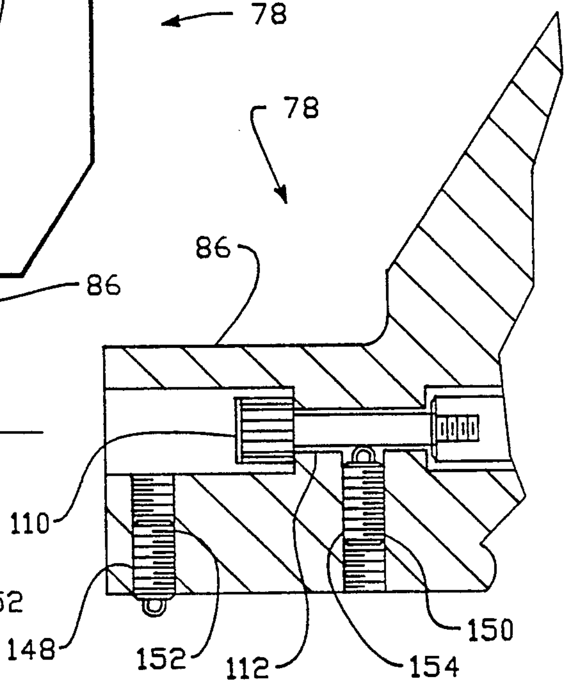
FIG. 7 depicts a view similar to FIG. 5, partially broken away to show a preloading device.

Turning to FIGS. 6 and 7, prepositioning devices 148, 150 are shown, in order, as discussed below, to preposition or prealign jaw 78 with respect to the body structure 72 prior to the introduction of work between the movable and fixed jaws 76, 78 and prior to the application of force by the piston 96. These preload devices include detents 152, 154 which are received in threaded shafts located beneath the bore 112 of the movable jaw 78 whioh receives the bolt 110 securing the movable jaw 78 to the piston 96. In the embodiment depicted, detent 152 bears on the body structure 72 and detent 154 bears on the bolt 110.

Figure 9:
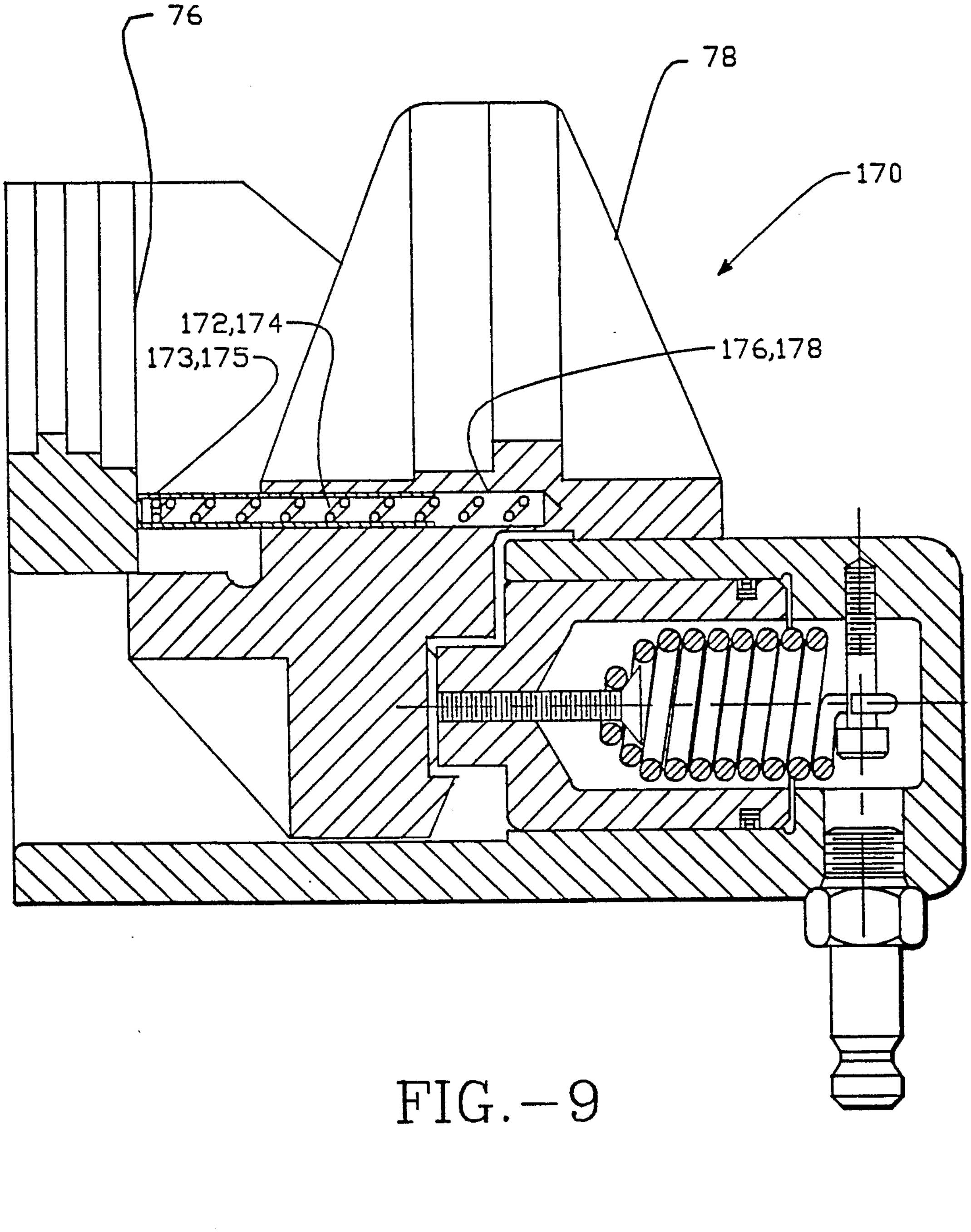
FIG. 9 depicts a view similar to FIG. 7 of an alternative preloading device of the invention.
Figure 10:
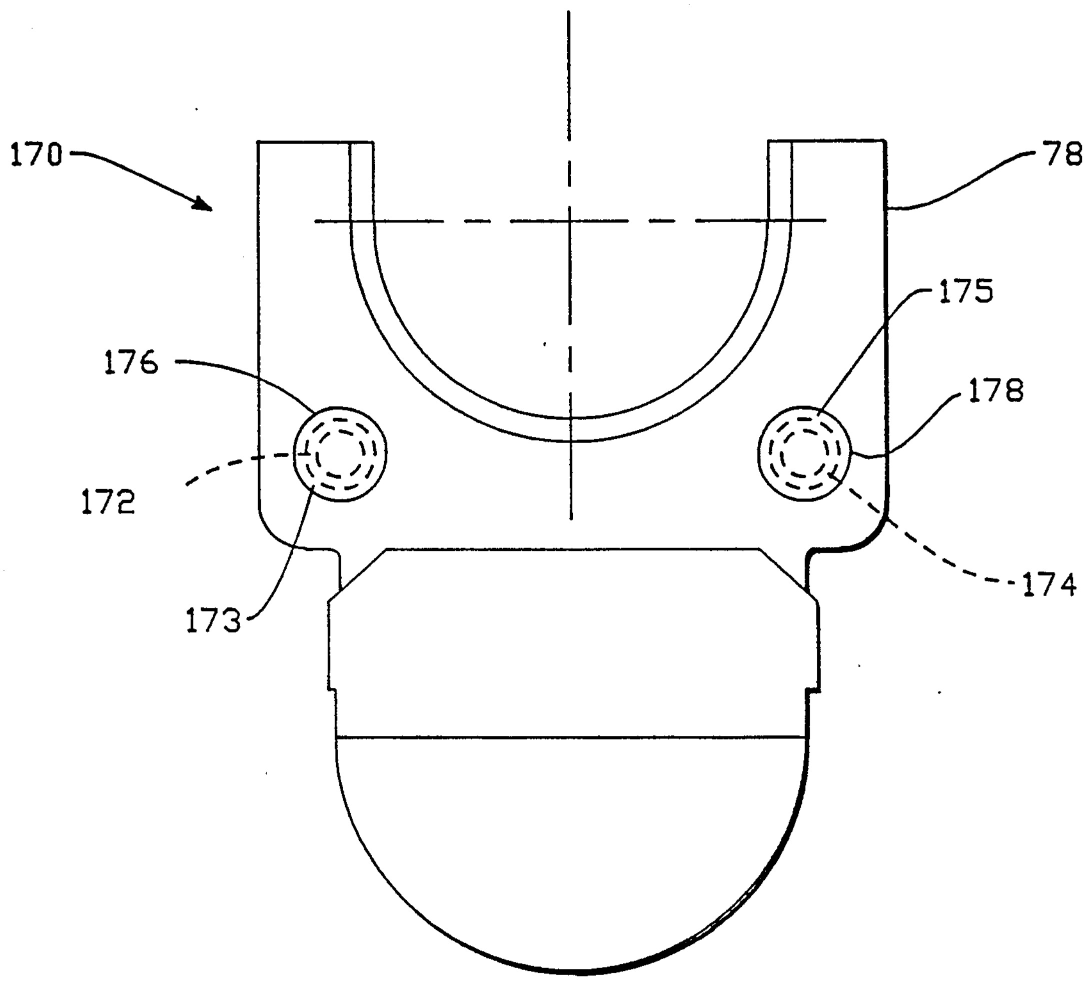
FIG. 10 depicts a view similar to FIG. 6 of the alternative preloading device of FIG. 9.
Figure 11:
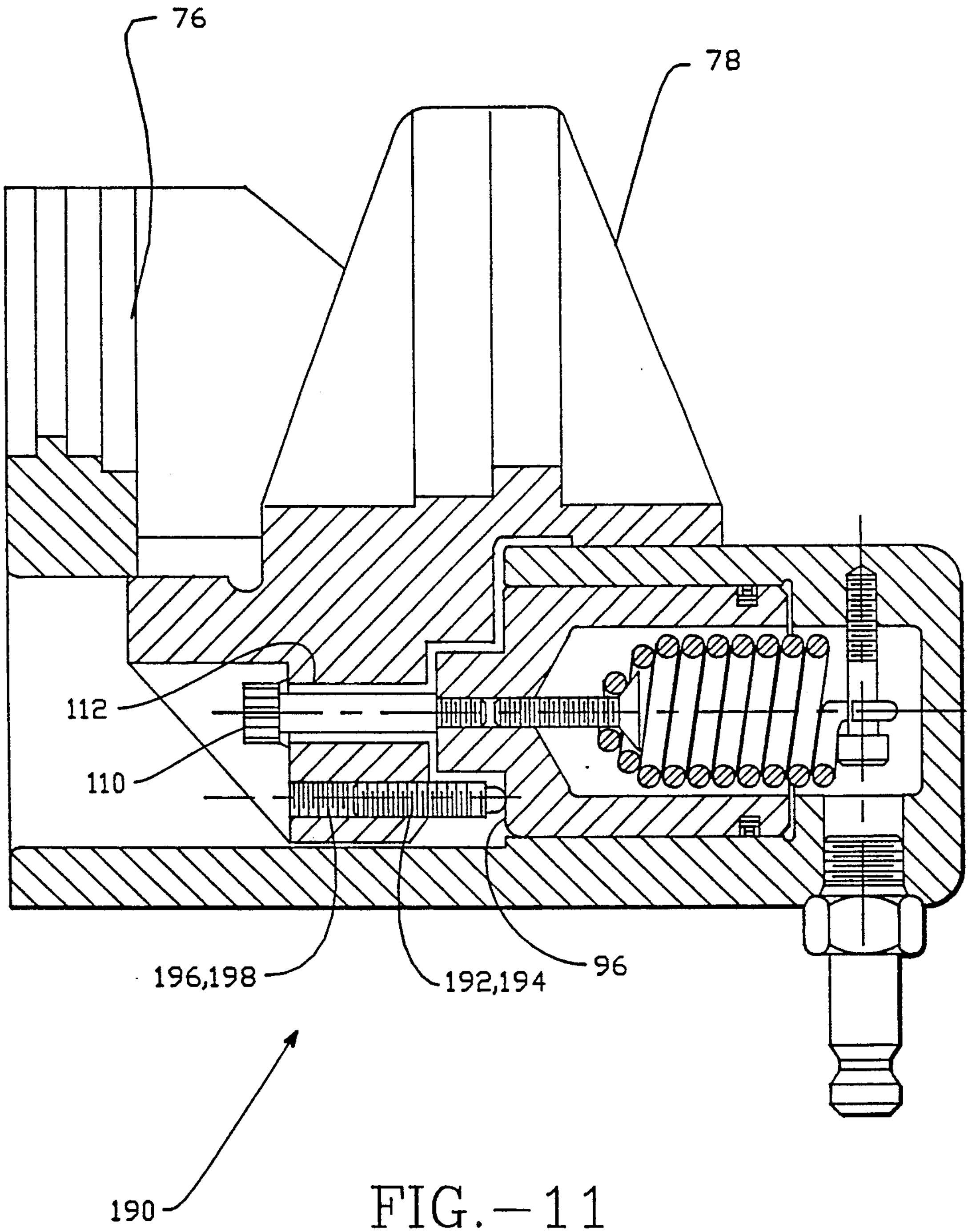
FIG. 11 depicts a view similar to FIG. 7 of yet another preloading device of the invention.
Figure 12:
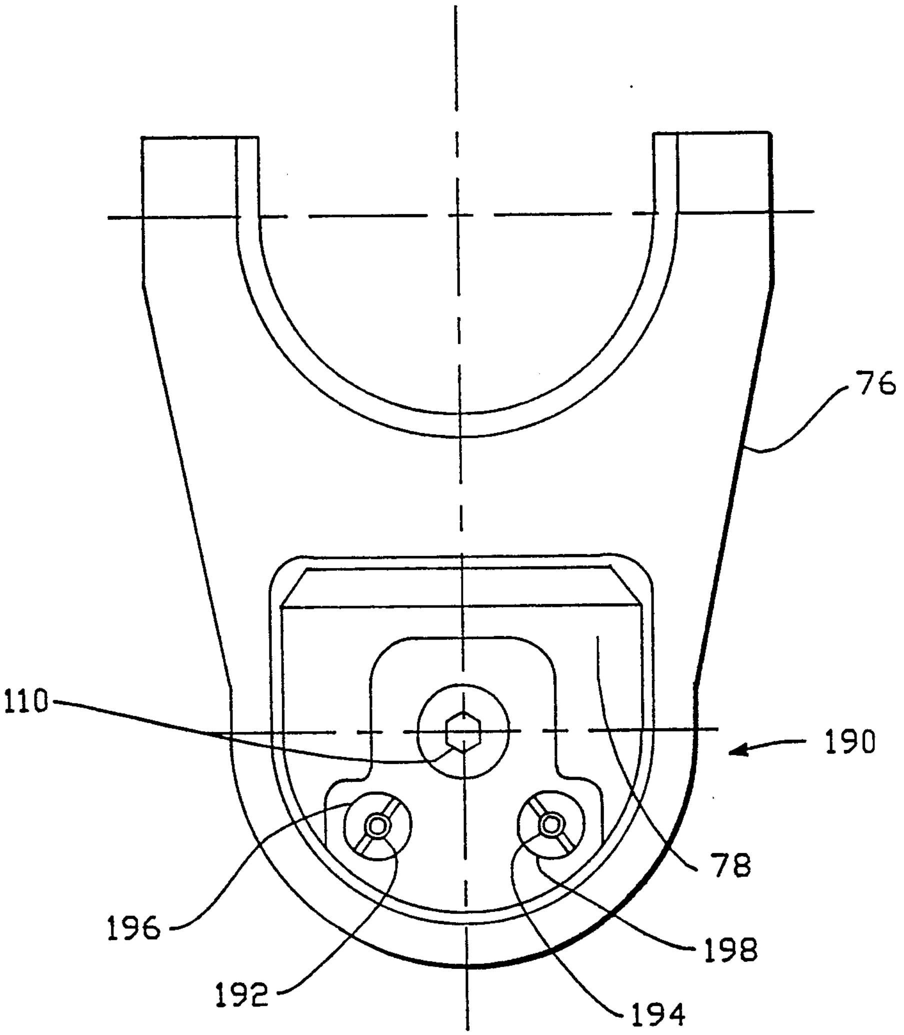
FIG. 12 depicts a view similar to FIG. 6 of the preloading device of FIG. 11.

Other arrangements can be fabricated to account for such preloading. For example, FIGS. 9, 10 depict preloading arrangement 170, and FIGS. 11, 12 depict preloading arrangement 190. Preloading arrangement 170 includes parallel preloading springs 172, 174 encased in sleeves 173, 175, which are received in bores 176, 178 located in the corners of moveable jaw 78 located above bearing surface 86. In this embodiment, there is no requirement for a bolt 110 as the springs 172, 174 hold movable jaw 78 in position prior to the jaws 76, 78 engaging a fitting. It is noted that the preloading springs 172, 174 assist spring 98 (FIG. 9) in the return of piston 96 when the hydraulic pressure is released.

The other alternative preloading arrangement 190 (FIGS. 11, 12) includes ball detents 192, 194 mounted in threaded bores 196, 198 which bores 196, 198 are located parallel to and below bore 112 which receives bolt 110. These ball detents 192, 194 place an axial preloading force near the base of piston 96. As with the other preloading arrangements, preloading arrangement 190 maintains moveable jaw 78 in aligned engagement with body structure 72 with bearing surfaces 86, 88 and 116, 119 in contrast with each other before a fitting is engaged between fixed pin 76 and movable jaw 78.

Industrial Applicability

The operation of the present invention is as described above. Based on this operation, it can be seen that the present invention is easier to manufacture, inspect, and align than prior devices and eliminates substantial localized wear on surfaces that move with respect to each other, allowing for the elimination of a net torsional loading or bending moment. Accordingly, the movable jaw does not have to be increased in size in order to counter such torsional loading and wear. The tool of the present invention is stiffer allowing for proper alignment and seating of even large fittings with less wear than experienced in the past.

The flexible arrangement 114 which secures the movable jaw 78 to the piston 96 as well as the preloading arrangement of FIGS. 6, 7, 9, 10, 11 and 12, allows for slight misalignment between the load bearing surfaces in order to relieve stress on the movable jaw 78.

It is to be understood that mechanisms other than a hydraulic cylinder and piston can be used in order to urge movable jaw 78 toward fixed jaw 76.

Other aspects and objects of the invention can be obtained from a review of the figures and the appended claims.

It is to be understood that other embodiments of the present invention can be fabricated which fall within :he spirit and scope of the claims hereof.

We claim;

1. A tool comprising:

body structure;

a first carrier unit formed by said body structure;

a second carrier unit;

mean for urging the second carrier unit toward the first carrier unit along a longitudinal axis, said urging means in the body structure;

means for mounting the second carrier unit onto said urging means so that the second carrier unit is mounted on said urging means;

said second carrier unit having a second carrier unit moment resisting means including a first bearing surface provided in sliding engagement with the body structure substantially adjacent the urging means and a second bearing surface in sliding engagement with respect to said body structure, said first and second bearing surface formed by the second carrier unit and wherein said first bearing surface is substantially parallel to said longitudinal axis and said second bearing surface is substantially parallel to said longitudinal axis;

a third bearing surface formed in the body structure beneath said first carrier unit and with said second bearing surface provided in sliding engagement with the third bearing surface beneath said first carrier unit as the second carrier unit is being urged toward the first carrier unit;

wherein said first bearing surface and said body structure are arranged with respect to each other such that a first load is transmitted between the first bearing surface and said body structure, which first load is substantially perpendicular to said longitudinal axis;

wherein said second bearing surface and the third bearing surface are arranged with respect to each other such that a second load is transmitted between the second bearing surface and the third bearing surface, which second load is substantially perpendicular to said longitudinal axis;

wherein said first load is substantially parallel to said second load; and wherein said first carrier unit and said second carrier unit form first and second work engaging means for engaging a work.

2. A tool of claim 1 wherein said first bearing surface is substantially parallel with, but faced oppositely with respect to said second bearing surface.

3. A tool of claim 1 wherein said first bearing surface exerts a force on said body structure represented by a first force vector and said second bearing surface exerts a force on said body structure represented by a second force vector and wherein said first force vector is substantially parallel with but oppositely directed with respect to the second force vector.

4. A tool of claim 1 wherein said first and second bearing surfaces are flat.

5. A tool of claim 1 including a central axis along which the urging means acts, and wherein said means for mounting the second carrier unit onto the urging means includes means for causing a force to be transferred from the urging means to the second carrier unit along the central axis.

6. A tool of claim 1 wherein said mounting means includes means for allowing for movement of the second carrier unit relative to the urging means.

7. A tool of claim 1 including means for preliminarily prepositioning the first and second bearing surfaces against the body structure before work is engaged in the first and second carrier units.

8. A tool of claim 7 wherein said prepositioning means are located in said second carrier unit.

9. A tool of claim 1 wherein said second carrier unit includes a bearing surface, which is formed at an angle to said second bearing surface which is slidingly engageable with respect to the body structure in order to resist movement of said second carrier unit across the direction of emotion of the second carrier unit toward the first carrier unit.

10. The tool of claim 1 including:

said second carrier unit being of a one-piece construction.

11. A tool comprising:

a body structure including a hydraulic cylinder;

a piston movably received in the hydraulic cylinder along a longitudinal axis;

a first carrier unit formed by said body structure;

a second carrier unit movable with the piston toward the first carrier unit;

means for mounting the second carrier unit onto the piston so that said second carrier unit is mounted on said piston;

said second carrier unit having a second carrier unit moment resisting means including a first bearing surface provided in sliding engagement with a portion of the body structure adjacent to the hydraulic cylinder and a second bearing surface provided in sliding engagement with respect to said body structure, said second carrier unit forming said first and second bearing surfaces and wherein said first bearing surface is substantially parallel to said longitudinal axis and said second bearing surface is substantially parallel to said longitudinal axis;

a third bearing surface formed in the body structure beneath said first carrier unit and with said second bearing surface provided in sliding engagement with the third bearing surface beneath said first carrier unit as the second carrier unit is being urged toward the first carrier unit;

wherein said first bearing surface and said body structure are arranged with respect to each other such that a first load is transmitted between the first bearing surface and said body structure, which first load is substantially perpendicular to said longitudinal axis;

wherein said second bearing surface and the third bearing surface are arranged with respect to each other such that a second load is transmitted between the second bearing surface and the third bearing surface, which second load is substantially perpendicular to said longitudinal axis;

wherein said first load is substantially parallel to said second load; and wherein said first carrier unit and said second carrier unit form first and second work receiving means, respectively.

12. The tool of claim 11 including:

said second carrier unit being of a one-piece construction.

13. The tool of claim 11 including:

said first bearing surface and said second bearing surface being substantially flat.

14. An assembly tool for a tube or pipe fitting for joining ends of a pair of tubes or pipes by application of opposing force on a fitting used to connect the ends of a pair tubes or pipes, the assembly tool comprising:

a body structure;

a first jaw unit formed by the body structure;

a second jaw unit;

means for urging the second jaw unit toward the first jaw unit along a longitudinal axis, said urging means formed in the body structure;

means for mounting said second jaws unit to said urging means so that the second jaw unit is mounted on said urging means;

said first and second jaw units having first and second coaxially disposed fitting engaging means for engaging a fitting therebetween;

said second jaw unit having a second jaw unit moment resisting means including a first bearing surface and a second bearing surface provided in sliding engagement with the body structure and oriented with respect to each other in order to resist moments resulting from the application of force on a fitting, which first and second bearing surfaces are formed by the second jaw unit and wherein said first bearing surface is substantially parallel to said longitudinal axis and said second bearing surface is substantially parallel to said longitudinal axis;

a third bearing surface formed in the body structure beneath said first jaw unit and with the second bearing surface provided in sliding engagement with the third bearing surface beneath said first jaw as the second jaw unit is being urged toward the first jaw unit;

wherein said first bearing surface and said body structure are arranged with respect to each other such that a first load is transmitted between the first bearing surface and said body structure, which first load is substantially perpeniduclar to said longitudinal axis;

wherein said second bearing surface and the third bearing surface are arranged with respect to each other such that a second load is transmitted between the second bearing surface and the third bearing surface, which second load is substantially perpendicular to said longitudinal axis; and wherein said first load is substantially parallel to said second load.

15. The assembly tool of claim 14 wherein said first bearing surface is substantially parallel with but faced oppositely with respect to said second bearing surface.

16. The assembly tool of claim 14 wherein said first bearing surface exerts a force on said body structure represented by a first force vector and said second bearing surface exerts a force on said body structure represented by a second force vector and wherein said first force vector is substantially parallel with but oppositely directed with respect to the second force vector.

17. The assembly tool of claim 14 wherein said first and second bearing surfaces are flat.

18. The assembly tool of claim 14 wherein said means for mounting the second jaw unit onto the urging means includes means for causing a force to be transferred from the urging means to the second jaw unit along a central axis of the urging means along which urging means acts.

19. The assembly tool of claim 14 wherein said mounting means includes means for allowing for the adjustment of the position of the second jaw unit with respect to the urging means.

20. The assembly tool of claim 11 including means for preliminarily prepositioning the first and second bearing surface against the body structure before work is received in the first and second jaw units.

21. The assembly tool of claim 20 wherein said prepositioning means are located in said second jaw unit.

22. The assembly tool of claim 14 wherein said second jaw unit includes a bearing surface, which is formed at an angle to said second bearing surface, which is slidingly engageable with respect to the body structure in order to resist movement of said second jaw unit across the direction of motion of the second jaw unit toward the first jaw unit.

23. The assembly tool of claim 14 wherein the second jaw unit moment resisting means includes said first bearing surface provided in sliding engagement with the body structure substantially adjacent the urging means.

24. The tool of claim 14 including:

said second jaw unit being of a one-piece construction.

25. A tool for placing force on a work comprising:

a body structure;

a first carrier unit formed by said body structure;

a second carrier unit;

means for urging the second carrier unit toward the first carrier unit along a longitudinal axis, said urging means formed in the body structure;

means for mounting the second carrier unit onto said urging means so that the second carrier unit is mounted on said urging means;

said first and second carrier unit having first and second work engaging means which define a common axis and engage a work in order to place a force on the work along the common axis and which common axis is substantially parallel to said longitudinal axis;

said second carrier unit having a second carrier unit moment resisting means including a first bearing surface and a second bearing surface provided in sliding engagement with the body structure and oriented with respect to each other and for resisting moment resulting from the application of force on a work and wherein said first bearing surface and said second bearing surface are formed by said second carrier unit and wherein said first bearing surface is substantially parallel to said longitudinal axis and said second bearing surface is substantially parallel to said longitudinal axis;

a third bearing surface formed in the body structure beneath said first carrier unit and with said second bearing surface provided in sliding engagement with the third bearing surface beneath said first carrier unit as the second carrier unit is being urged toward the first carrier unit;

wherein said first bearing surface and said body structure are arranged with respect to each other such that a first load is transmitted between the first bearing surface and said body structure, which first load is substantially perpendicular to said longitudinal axis;

wherein said second bearing surface and the third bearing surface are arranged with respect to each other such that a second load is transmitted between the second bearing surface and the third bearing surface, which second load is substantially perpendicular to said longitudinal axis; and wherein said first load is substantially parallel to said second load.

26. The tool of claim 25 including:

said second carrier unit being of a one-piece construction.

27. A tool comprising:

a body structure including a hydraulic cylinder;

a piston movably received in the hydraulic cylinder;

a first carrier unit formed by said body structure;

a second carrier unit movable with the piston toward the first carrier unit;

means for mounting the second carrier unit onto the piston so that said second carrier unit is mounted on said piston;

said second carrier unit having a second carrier unit moment resisting means including a first bearing surface provided in sliding engagement with a portion of the body structure adjacent to the hydraulic cylinder and a second bearing surface provided in sliding engagement with respect to said body structure, said second carrier unit forming said first and second bearing surface;

a third bearing surface formed in said body structure, said third bearing surface located adjacent said first carrier unit and with said second bearing surface provided in sliding engagement with the third bearing surface as the second carrier unit is being urged toward the first carrier unit;

said piston having a longitudinal axis along which said piston moves with the piston moving said second carrier unit toward the first carrier unit;

wherein said first bearing surface is substantially parallel to said longitudinal axis and said second bearing surface is substantially parallel to said longitudinal axis;

wherein said first bearing surface and said body structure are arranged with respect to each other such that a first load is transmitted between the first bearing surface and said body structure, which first load is substantially perpendicular to said longitudinal axis;

wherein said second bearing surface and the third bearing surface are arranged with respect to each other such that a second load is transmitted between the second bearing surface and the third bearing surface, which second load is substantially perpendicular to said longitudinal axis;

wherein said first load is substantially parallel to said second load;

said first carrier unit disposed substantially radially from said longitudinal axis;

said second load is aligned with the radially disposed first carrier unit; and wherein said first carrier unit and said second carrier unit form first and second work receiving means, respectively.

28. A tool comprising:

body structure;

a first carrier unit formed by said body structure;

a second carrier unit;

means of using the second carrier unit toward the first carrier unit, said urging means formed in the body structure;

means for mounting the second carrier unit onto said urging means so that the second carrier unit is mounted on said urging means;

said second carrier unit having a second carrier unit moment resisting means including a first bearing surface provided in sliding engagement with the body structure substantially adjacent the urging means and a second bearing surface urgeable into sliding engagement with respect to said body structure substantially adjacent said first carrier unit, said first and second bearing surfaces formed by the second carrier unit;

a third bearing surface formed in the body structure adjacent said first carrier unit and with said second bearing surface provided in sliding engagement with the third bearing surface as the second carrier unit is being urged toward the first carrier unit;

said urging means having a longitudinal axis along which said urging means moves with said second carrier unit being urged toward the first carrier unit;

wherein said first bearing surface is substantially parallel to said longitudinal axis and said second bearing surface is substantially parallel to said longitudinal axis;

wherein said first bearing surface and said body structure are arranged with respect to each other such that a first load is transmitted between the first bearing surface sand said body structure, which first load is substantially perpendicular to said longitudinal axis;

wherein said second bearing surface and the third bearing surface are arranged with respect to each other such that a second load is transmitted between the second bearing surface and the third bearing surface, which second load is substantially perpendicular to said longitudinal axis;

wherein said first load is substantially parallel to said second load;

said first carrier unit disposed substantially radially from said longitudinal axis;

said second load is aligned with the radially disposed first carrier unit; and wherein said first carrier unit and said second carrier unit form first and second work engaging means adapted for engaging a work.

29. An assembly tool for a tube or pipe fitting for joining ends of a pair of tubes or pipes by application of opposing force on a fitting used to connect the ends of a pair of tubes or pipes, the assembly tool comprising:

a body structure;

a first jaw unit formed by the body structure;

a second jaw unit;

means for urging the second jaw unit toward the first jaw unit, said urging means formed in the body structure;

means for mounting said second jaw unit to said urging means so that the second jaw unit is mounted on said urging means;

said first and second jaw units having first and second coaxially disposed fitting engaging means for engaging a fitting therebetween;

said second jaw unit having a second jaw unit moment resisting means including a first bearing surface and a second bearing surface provided in sliding engagement with the body structure and oriented with respect to each other in order to resist moments resulting from the application of force on a fitting, which first and second bearing surfaces are formed by the second jaw unit;

a third bearing surface formed in the body structure adjacent said first jaw unit and with the second bearing surface provided in sliding engagement with the third bearing surface as the second jaw unit is being urged toward the first jaw unit;

said urging means having a longitudinal axis along which said urging means moves with said second jaw unit being urged toward the first jaw unit;

said first jaw unit disposed substantially radially from said longitudinal axis;

wherein said first being surface is substantially parallel to said longitudinal axis and said second bearing surface is substantially parallel to said longitudinal axis;

wherein said first bearing surfaces and said body structure are arranged with respect to each other such that a first load is transmitted between the first bearing surface and said body structure, which first load is substantially perpendicular to said longitudinal axis;

wherein said second bearing surface and the third bearing surface are arranged with respect to each other such that a second load is transmitted between the second bearing surface and the third bearing surface, which second load is substantially perpendicular to said longitudinal axis;

wherein said first load is substantially parallel to said second load; and said second load is aligned with the radially disposed first jaw unit.

30. A tool for placing force on a work comprising:

a body structure;

a first carrier unit formed by said body structure;

a second carrier unit;

means for urging the second carrier unit toward the first carrier unit, said urging means formed in the body structure;

means for mounting the second carrier unit onto said urging means so that the second carrier unit is mounted on said urging means;

said first and second carrier unit having first and second work engaging means which define a common axis and for engaging a work in order to place a force on the work along the common axis;

said second carrier unit having a second carrier unit moment resisting means including a first bearing surface and a second bearing surface provided in sliding engagement with the body structure and oriented with respect to each other and for resisting moments resulting from the application of force on a work and wherein said first bearing surface and said second bearing surfaces are formed by said second carrier unit;

a third bearing surface formed in the body structure adjacent said first carrier unit and with said second bearing surface provided in sliding engagement with the third bearing surface as the second carrier unit is being urged toward the first carrier unit; and said urging means having a longitudinal axis along which said urging means moves with said second jaw unit being urged toward the first jaw unit and wherein said common axis is substantially parallel to said longitudinal axis;

said first jaw unit disposed substantially radially from said longitudinal axis of the urging means;

wherein said first bearing surface is substantially parallel to said longitudinal axis and said second bearing surface is substantially parallel to said longitudinal axis;

wherein said first bearing surface and said body structure are arranged with respect to each other such that a first load is transmitted between the first bearing surface and said body structure, which first load is substantially perpendicular to said longitudinal axis;

wherein said second bearing surface and the third bearing surface are arranged with respect to each other such that a second load is transmitted between the second bearing surface and the third bearing surface, which second load is substantially perpendicular to said longitudinal axis;

wherein said first load is substantially parallel to said second load; and said second load is aligned with the radially disposed first jaw unit.

* * * * *